United States Patent
Dellemann et al.

(10) Patent No.: US 11,327,512 B1
(45) Date of Patent: May 10, 2022

(54) HYDRAULIC LOCKOUT LEVER FAILURE DETECTION SYSTEM

(71) Applicants: ZOOMLION Heavy Industry NA, Inc., Yorkville, WI (US); ZOOMLION Heavy Industry Science and Technology Co. Ltd., Changsha (CN)

(72) Inventors: Robert Dellemann, Waterford, WI (US); Guy A. Moore, West Allis, WI (US); Robert Willard, Yorkville, WI (US)

(73) Assignees: ZOOMLION HEAVY INDUSTRY NA, INC., Yorkville, WI (US); ZOOMLION HEAVY INDUSTRY SCIENCE AND TECHNOLOGY CO, LTD., Changsha (CN)

( * ) Notice: Subject to any disclaimer, the term of this patent is extended or adjusted under 35 U.S.C. 154(b) by 99 days.

(21) Appl. No.: 17/076,874

(22) Filed: Oct. 22, 2020

(51) Int. Cl.
| | |
|---|---|
| *E02F 9/22* | (2006.01) |
| *G05D 7/06* | (2006.01) |
| *F15B 13/044* | (2006.01) |
| *E02F 9/26* | (2006.01) |
| *E02F 9/24* | (2006.01) |

(52) U.S. Cl.
CPC ........... *G05D 7/0629* (2013.01); *E02F 9/226* (2013.01); *F15B 13/044* (2013.01); *E02F 9/24* (2013.01); *E02F 9/267* (2013.01)

(58) Field of Classification Search
CPC .................................... E02F 9/226; E02F 9/24
USPC ..................... 251/129.04, 89.04, 95
See application file for complete search history.

(56) References Cited

U.S. PATENT DOCUMENTS

| | | | | | |
|---|---|---|---|---|---|
| 4,385,863 | A | * | 5/1983 | Minor | E02F 9/166 200/61.58 B |
| 4,704,915 | A | * | 11/1987 | Friesen | G05G 5/06 74/471 XY |
| 4,969,527 | A | * | 11/1990 | Boe | A01B 63/1006 172/7 |
| 5,425,431 | A | * | 6/1995 | Brandt | B60R 21/02 180/269 |
| 5,445,575 | A | * | 8/1995 | Sundeen | B60R 25/02144 477/99 |
| 5,488,787 | A | * | 2/1996 | Aoyagi | E02F 9/226 701/50 |
| 5,499,553 | A | * | 3/1996 | Schott | G05G 5/06 74/532 |
| 5,931,254 | A | * | 8/1999 | Loraas | E02F 9/24 180/272 |

(Continued)

*Primary Examiner* — Robert K Arundale
(74) *Attorney, Agent, or Firm* — Donald J. Ersler

(57) ABSTRACT

A hydraulic lockout lever failure detection system preferably includes a first analog sensor, a second analog sensor, at least one electronic control module (ECU) and a solenoid valve. The voltage output level of the first and second analog sensors is monitored by the ECU. The solenoid valve controls the flow of hydraulic fluid to operate an excavator or other equipment. The operation of the solenoid valve is controlled by the ECU. However, a second ECU may be used to control the operation of the solenoid valve. A hydraulic lockout lever causes the first and second analog sensors to output either a low voltage to indicate a closed position, or to indicate an open position to the ECU. If the first and second analog sensors output a voltage that is above a low set value or above a high set value, a fault is detected.

3 Claims, 4 Drawing Sheets

(56) References Cited

U.S. PATENT DOCUMENTS

| | | | | |
|---|---|---|---|---|
| 6,135,230 | A * | 10/2000 | Schenck | E02F 9/24 |
| | | | | 180/269 |
| 6,493,616 | B1 * | 12/2002 | Rossow | F15B 21/08 |
| | | | | 701/50 |
| 9,828,080 | B1 * | 11/2017 | Belter | B63H 21/22 |
| 2005/0035669 | A1 * | 2/2005 | Bares | E05B 85/247 |
| | | | | 307/326 |
| 2014/0137540 | A1 * | 5/2014 | Ko | F02K 3/06 |
| | | | | 60/226.2 |
| 2021/0017737 | A1 * | 1/2021 | Schwartz | B60W 30/18054 |
| 2021/0094417 | A1 * | 4/2021 | Cobo | E02F 9/2083 |
| 2021/0180623 | A1 * | 6/2021 | Tanaka | E02F 9/225 |
| 2021/0317633 | A1 * | 10/2021 | Sherlock | H04N 7/183 |

\* cited by examiner

| 1ST SW | 2ND SW | LOCKOUT SENSOR STATUS |
|---|---|---|
| 0 | 0 | LOCK |
| 0 | 1 | FAULT |
| 1 | 0 | FAULT |
| <.5V OR > 4.5V | X | FAULT |
| X | <.5V OR > 4.5V | FAULT |
| 1 | 1 | UNLOCK |

FIG. 3

HYDRAULIC LOCKOUT LEVER FAILURE DETECTION SYSTEM

BACKGROUND OF THE INVENTION

1. Field of the Invention

The present invention relates generally to heavy equipment and more specifically to a hydraulic lockout lever failure detection system, which is used to prevent an excavator or other equipment from being operated when a closed circuit failure occurs in both switches of a dual sensor detection system.

2. Discussion of the Prior Art

A common way to monitor a hydraulic lockout lever position in an excavator is to use two switches connected to a first verification control unit (VCU). The VCU sends a communication signal to a second electronic control unit (HCU), which controls a lockout solenoid valve. The lockout solenoid valve allows the flow of hydraulic fluid to operate equipment. If the hydraulic lockout lever is raised, the VCU will see the unlock state of the two switches and send a control signal to the VCU to open the lockout solenoid valve. If the hydraulic lockout lever is lowered, the VCU will see the locked state of the two switches and the lockout solenoid valve will not be energized to allow the flow of hydraulic fluid. The redundant switches detect if one of the switches is bad and can alert the operator of the malfunction.

However, a case, where both switches fail in the unlocked position (closed-circuit fault) and an operator is already operating the excavator, is not addressed. In this case, failure detection is impossible when the operator physically puts the hydraulic lockout lever from the unlocked position into the locked position. Operator may think that he has locked the hydraulics safely, but the hydraulics would not locked by the system.

Accordingly, there is clearly felt need in the art for a hydraulic lockout lever failure detection system, which is used to prevent an excavator from being operated when a closed circuit failure occurs by replacing both switches with two analog sensors.

SUMMARY OF THE INVENTION

The present invention provides a hydraulic lockout lever with failure detection, which is used to prevent an excavator from being operated when a closed circuit failure occurs. The hydraulic lockout lever with failure detection (lockout failure detection system) preferably includes a first analog sensor, a second analog sensor, at least one electronic control module (ECU) and a lockout solenoid valve. The voltage output level of the first and second analog sensors is monitored by the ECU. The first and second analog sensors preferably have a normal low voltage output of between 0.55 volts-1.1 volts. The first and second analog sensors preferably have a normal high voltage output of between 3.65 volts to 4.35 volts. The lockout solenoid valve controls the flow of hydraulic fluid to operate an excavator or similar equipment. The operation of the lockout solenoid valve is controlled by the ECU. However, a second ECU may be used to control the operation of the lockout solenoid valve.

A hydraulic lockout lever causes the first and second analog sensors to output a low voltage, when the hydraulic lockout lever is in a closed or locked position of 0 degrees. The hydraulic lockout lever causes the first and second analog sensors to output a high voltage, when the hydraulic lockout lever is lifted to an open or unlocked position of 90 degrees. The lockout solenoid valve is locked (does not allow the flow of hydraulic fluid) when the first and second analog sensors output a low voltage greater than 0.5 volts. The lockout solenoid valve is unlocked (allows the flow of hydraulic fluid) when the first and second analog sensors output a high voltage of less than 4.5 volts. The low voltage corresponds to the handle being in a down position and the high voltage corresponds to the handle being in an up position. A failure occurs when either or both of the first and second analog sensors have a low voltage output of less than 0.5 volts, or the high voltage output is greater than 4.5 volts. If the operator puts the hydraulic lockout lever into a closed position and either or both of the first and second analog sensors output a low voltage less than 0.5 volts, a failure is detected. If the hydraulic lockout lever is in an open position and either or both of the first and second analog sensors output a voltage above 4.5 volts, a failure is detected.

Accordingly, it is an object of the present invention to provide a lockout failure detection system, which is used to prevent an excavator from being operated when a closed circuit failure occurs by replacing both switches with two analog sensors.

These and additional objects, advantages, features and benefits of the present invention will become apparent from the following specification.

BRIEF DESCRIPTION OF THE DRAWINGS

FIG. 3 is a logic table for a lockout failure detection system, which provides the results of different sensor output combinations in accordance with the present invention.

DETAILED DESCRIPTION OF THE PREFERRED EMBODIMENTS

Figure 1:
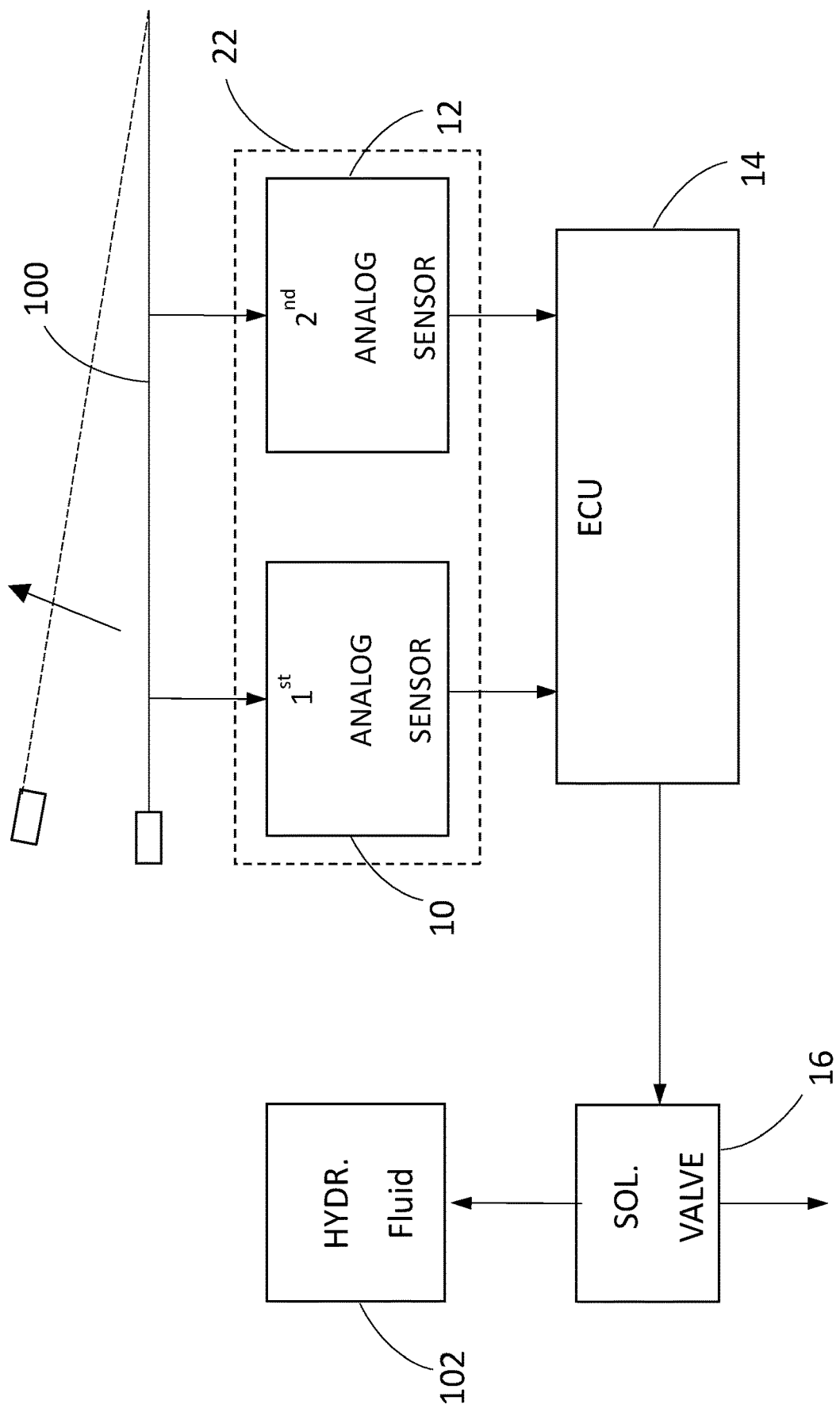
FIG. 1 is a schematic diagram of a lockout failure detection system with a single ECU in accordance with the present invention.

With reference now to the drawings, and particularly to FIG. 1, there is shown a schematic diagram of a lockout failure detection system 1. The lockout failure detection system 1 preferably includes a first analog sensor 10, a second analog sensor 12, an electronic control module (ECU) 14 and a lockout solenoid valve 16. The voltage output levels of the first and second analog sensors 10, 12 is monitored by the ECU 14. A model no. PST360 analog sensor by Piher Sensors & Controls SA has been found to provide satisfactory performance, which is hereby incorporated by reference into this application in its entirety. However, other types of analog sensors may also be used. The first and second analog sensors preferably have a normal low voltage output of between 0.55 volts-1.1 volts, and a normal high voltage output of between 3.65 volts to 4.35 volts. The first and second analog sensors 10, 12 are set to a low voltage output by a closed or locked position of the hydraulic lockout lever 100. The first and second analog sensors 10, 12 are set to a high voltage output by an open or unlocked position of the hydraulic lockout lever 100. The ECU 14 receives the voltage output from the first and second analog sensors 10, 12. The lockout solenoid valve 16 controls the flow of hydraulic fluid 102 to operate an excavator or similar equipment. The lockout solenoid valve 16 is energized by the ECU 14, when a hydraulic lockout lever 100 is placed in the open or unlocked position.

Figure 2:
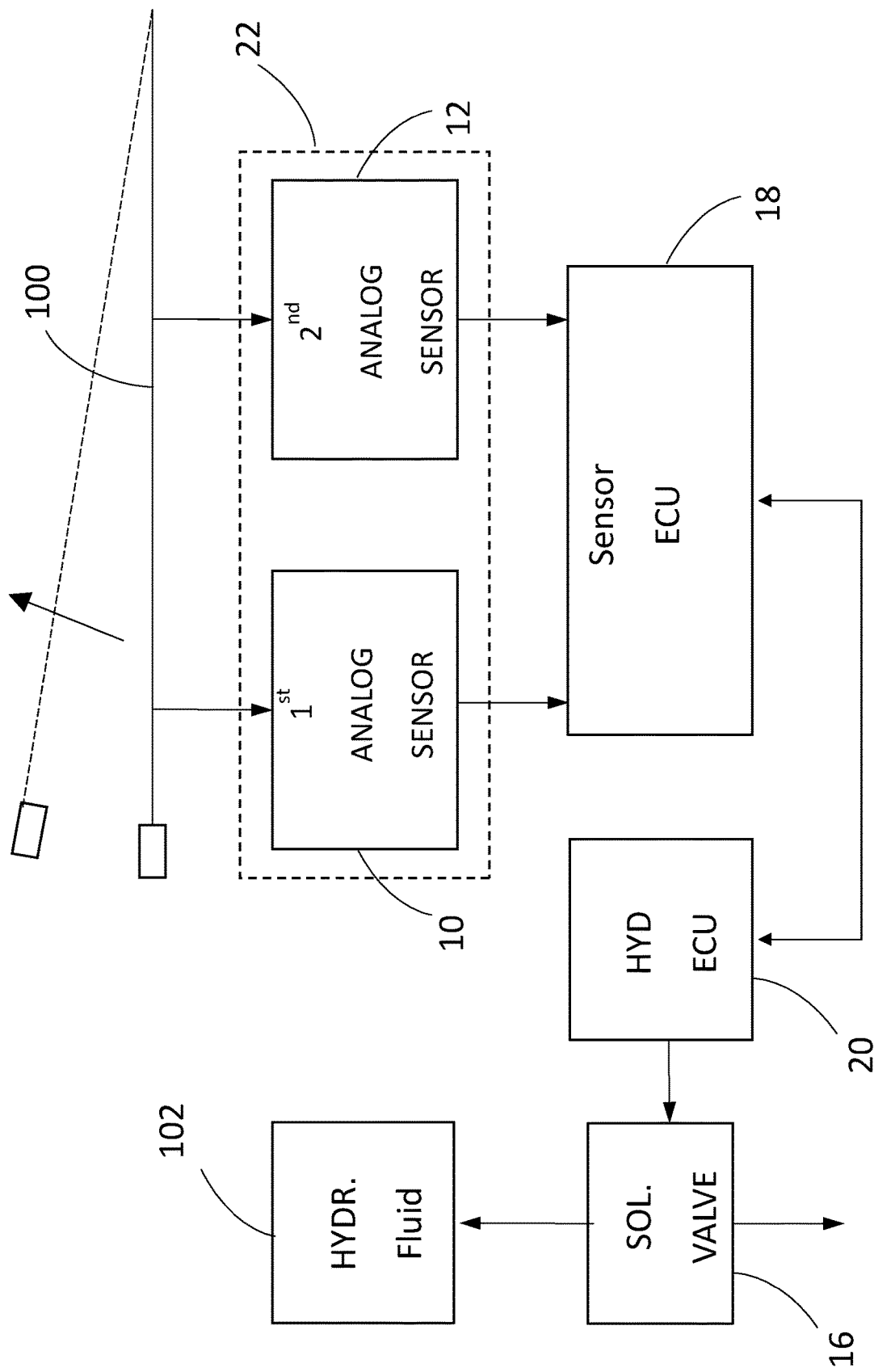
FIG. 2 is a schematic diagram of a lockout failure detection system with a sensor ECU and a hydraulic ECU in accordance with the present invention.

With reference to FIG. 2, a lockout failure detection system 2, includes the first analog sensor 10, the second analog sensor 12, the lockout solenoid valve 16, a sensor ECU 18 and a hydraulic ECU 20. The sensor ECU 18 receives the voltage output from the first and second analog sensors 10, 12. The lockout solenoid valve 16 is energized by the hydraulic ECU 20, when a hydraulic lockout lever 100 is placed in an open or unlocked position. The solenoid valve 16 is a normally closed type. The sensor ECU 18 communicates a position of the hydraulic lockout lever 100 to the hydraulic ECU 20 with a control signal. The hydraulic lockout lever 100 causes the first and second analog sensors 10, 12 to output a low voltage, when the hydraulic lockout lever 100 is in a closed or locked position of 0 degrees. The hydraulic lockout lever 100 causes the first and second analog sensors 10, 12 to output a high voltage, when the hydraulic lockout lever 100 is lifted to an open or unlocked position of 90 degrees.

The lockout solenoid valve 16 is locked (does not allow the flow of hydraulic fluid) when the first and second analog sensors 10, 12 output a low voltage greater than 0.5 volts. The solenoid valve 16 is unlocked (allows the flow of hydraulic fluid) when the first and second analog sensors 10, 12 output a high voltage of less than 4.5 volts. With reference to FIG. 3, a failure occurs when one of the first and second analog sensor 10, 12 outputs a voltage high and the other outputs a voltage low. A failure also occurs when either or both of the first and second analog sensors 10, 12 have a low voltage output of less than 0.5 volts, or the high voltage output is greater than 4.5 volts. If the operator puts the hydraulic lockout lever 100 into a closed position and either or both of the first and second analog sensors 10, 12 output a low voltage less than 0.5 volts or a voltage of above 4.5 volts, a failure is detected. If the hydraulic lockout lever 100 is in an open position and either or both of the first and second analog sensors output a voltage of above 4.5 volts or a voltage below 0.5 volts, a failure is detected. The symbol "X" denotes that the first or second analog sensor may have any value.

Figure 4:
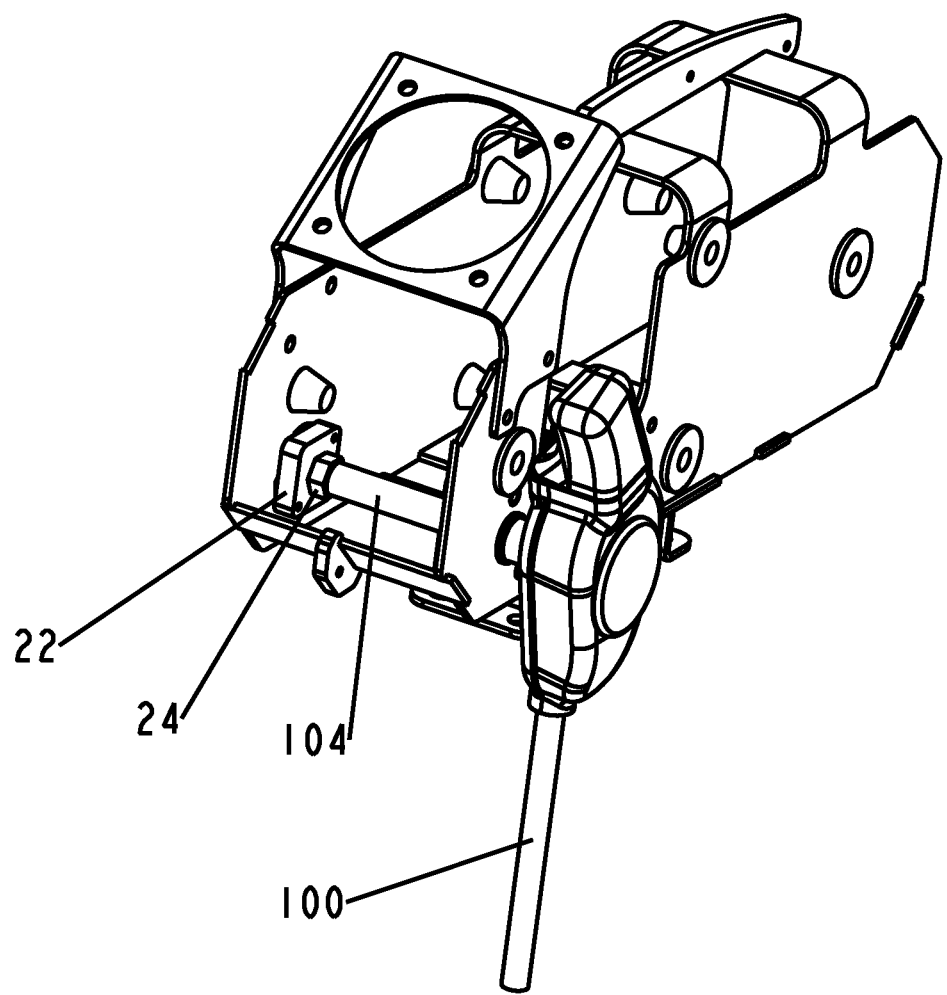
FIG. 4 is a perspective view of a hydraulic lockout lever and a sensor package of a lockout failure detection system installed on a piece of equipment in accordance with the present invention.

With reference to FIG. 4, an analog sensor package 22 includes the first analog sensor 10 and the second analog sensor 12. The first and second analog sensors 10, 12 output a low voltage or a high voltage according to a position of the hydraulic lockout lever 100. The low voltage indicates that the hydraulic lockout lever 100 is in a locked or lowered position. The high voltage indicates that the hydraulic lockout lever 100 is in an unlocked or raised position. The hydraulic lockout lever 100 includes an output shaft 104. The analog sensor package 22 includes a rotary contact 24. The rotary contact 24 includes a double "D" shaped hole, which is sized to receive an output shaft 104 of the hydraulic lockout lever 100. The rotary contact 24 is rotated by the output shaft 104 to actuate the first and second analog sensors 10, 12 to output the low voltage or the high voltage. However, other methods for the hydraulic lockout lever 100 to actuate first and second analog sensors may also be used.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A method of detecting a failure of a hydraulic lockout lever system, comprising the steps of:
    providing a first analog sensor and a second analog sensor, each said analog sensor includes a low voltage output and a high voltage output;
    engaging said hydraulic lockout lever with said first and second analog sensors, said first and second analog sensors output a low voltage when said hydraulic lockout lever is in a lowered position, said first and second analog sensors output a high voltage when said hydraulic lockout lever is in a raised position;
    providing a solenoid valve for controlling the flow of hydraulic fluid; and
    providing an ECU for receiving a voltage output from said first and second analog sensors, said ECU energizing said solenoid valve to allow a flow of the hydraulic fluid when both said first and second analog sensors output said high voltage.

2. A method of detecting a failure of a hydraulic lockout lever system, comprising the steps of:
    providing a first analog sensor and a second analog sensor, each said analog sensor includes a low voltage output and a high voltage output;
    engaging said hydraulic lockout lever with said first and second analog sensors, said first and second analog sensors output a low voltage when said hydraulic lockout lever is in a lowered position, said first and second analog sensors output a high voltage when said hydraulic lockout lever is in a raised position;
    providing a solenoid valve for controlling the flow of hydraulic fluid;
    providing an ECU for receiving a voltage output from said first and second analog sensors, said ECU energizing said solenoid valve to allow a flow of the hydraulic fluid when both said first and second analog sensors output said high voltage; and
    sensing a fault when said first or second analog sensors output a voltage to said ECU which is below said low voltage output or above said high voltage output values.

3. A method of detecting a failure of a hydraulic lockout lever system, comprising the steps of:
    providing a first analog sensor and a second analog sensor, each said analog sensor includes a low voltage output and a high voltage output;
    engaging said hydraulic lockout lever with said first and second analog sensors, said first and second analog sensors output a low voltage when said hydraulic lockout lever is in a lowered position, said first and second analog sensors output a high voltage when said hydraulic lockout lever is in a raised position;
    providing a solenoid valve for controlling the flow of hydraulic fluid;
    providing a sensor ECU for receiving a voltage output from said first and second analog sensors; and
    providing a hydraulic ECU which receives a control signal from said sensor ECU, said hydraulic ECU energizes said solenoid valve to allow a flow of the hydraulic fluid when both said first and second analog sensors output said high voltage.

* * * * *